(12) United States Patent
Wilensky

(10) Patent No.: US 6,912,298 B1
(45) Date of Patent: Jun. 28, 2005

(54) OBJECT DETECTION USING DYNAMIC PROBABILITY SCANS

(75) Inventor: Gregg D. Wilensky, Pacific Palisades, CA (US)

(73) Assignee: Adobe Systems Incorporation, San Jose, CA (US)

( * ) Notice: Subject to any disclaimer, the term of this patent is extended or adjusted under 35 U.S.C. 154(b) by 95 days.

(21) Appl. No.: 10/639,238

(22) Filed: Aug. 11, 2003

(51) Int. Cl.[7] .............................................. A61B 5/117
(52) U.S. Cl. ...................... 382/117; 382/115; 382/190; 382/199; 345/581
(58) Field of Search ................................ 382/194, 190, 382/195, 199, 117, 115; 345/581, 619

(56) References Cited

U.S. PATENT DOCUMENTS

| | | | |
|---|---|---|---|
| 6,204,858 B1 | | 3/2001 | Gupta |
| 2002/0106112 A1 | * | 8/2002 | Chen et al. ................. 382/117 |
| 2003/0190080 A1 | * | 10/2003 | Simard et al. .............. 382/238 |

OTHER PUBLICATIONS

Jia Li and James Z. Wang, "Automatic Linguistic Indexing of Pictures By a Statistical Modeling Approach," Abstract, pp. 1–24 (2003).

Jiuliu Lu and Lawrence Carin, Dept. of Electrical and Computer Engineering, Duke University, Durham, NC 27708–0291, "Hidden Markov Multiresolution Textures Segmentation," Abstract, pp. 1–28.

* cited by examiner

*Primary Examiner*—Richard Hjerpe
*Assistant Examiner*—Michelle K. Lay
(74) *Attorney, Agent, or Firm*—Fish & Richardson P.C.

(57) ABSTRACT

Methods and apparatus, including computer program products, for detecting an object in an image. The techniques include scanning a sequence of pixels in the image, each pixel having one or more property values associated with properties of the pixel, and generating a dynamic probability value for each of one or more pixels in the sequence. The dynamic probability value for a given pixel represents a probability that the given pixel has neighboring pixels in the sequence that correspond to one or more features of the object. The dynamic probability value is generated by identifying a dynamic probability value associated with a pixel that immediately precedes the given pixel in the sequence; updating the identified dynamic probability value based on the property values of the immediately preceding pixel; and associating the updated probability value with the given pixel.

28 Claims, 4 Drawing Sheets

OBJECT DETECTION USING DYNAMIC PROBABILITY SCANS

BACKGROUND OF THE INVENTION

The present invention relates to detecting objects in an image.

Conventional object detection techniques involve scanning an image pixel by pixel and for each pixel in the image, comparing a two-dimensional region of pixels centered on the pixel against a two-dimensional template of the expected object. This process can be slow and computationally intensive.

Furthermore, to account for distortions among individual occurrences of the object, it is typical that multiple templates are used and the process is repeated for each template. This further increases the time and computational requirements of the process.

One application of object detection is redeye detection. When exposed to flash lighting, the retina of a human eye reflects red light. This causes portions of the eye, typically portions of the pupil or iris, to appear red in photographic images. This effect is commonly referred to as redeye. Object detection techniques can be used to identify portions of the image that have been discolored as a result of the redeye effect.

SUMMARY OF THE INVENTION

The invention provides methods and apparatus, including computer program products, for detecting an object in an image. In general, in one aspect, the techniques include scanning a sequence of pixels in the image, each pixel having one or more property values associated with properties of the pixel, and generating a dynamic probability value for each of one or more pixels in the sequence. The dynamic probability value for a given pixel represents a probability that the given pixel has neighboring pixels in the sequence that correspond to one or more features of the object. The dynamic probability value is generated by identifying a dynamic probability value associated with a pixel that immediately precedes the given pixel in the sequence; updating the identified dynamic probability value based on the property values of the immediately preceding pixel; and associating the updated probability value with the given pixel.

Particular implementations can include one or more of the following features. Updating the identified dynamic probability value can include calculating an intrinsic probability value for the immediately preceding pixel based on one or more property values for the immediately preceding pixel, wherein the intrinsic probability value for the immediately preceding pixel represents a probability that the immediately preceding pixel corresponds to one or more features of the object; and updating the identified dynamic probability value based on the intrinsic probability value calculated for the immediately preceding pixel. Updating the identified dynamic probability value can include multiplying the identified dynamic probability value by a weighting coefficient. The dynamic probability value can be a vector that includes one or more components, each component corresponding to a different feature of the object. The method can further comprise using the dynamic probability value of a pixel to calculate an object probability value for the pixel, the object probability value representing the probability that the pixel corresponds to the object. The object can be an eye. A feature of the object can be a redeye effect.

In general, in another aspect, the techniques include scanning a sequence of pixels in the image, each pixel having one or more property values for one or more properties of the pixel; calculating a set of feature probability values for each of one or more pixels in the sequence, each feature probability value representing a probability that the pixel corresponds to a feature of the object, each feature probability in the set corresponding to a different feature of the object; and using the feature probability values to calculate an object probability value for the pixel, the object probability value representing the probability that the pixel corresponds to the object. Each feature probability includes a dynamic probability value that is generated by identifying the dynamic probability value of an immediately preceding pixel in the sequence, updating the identified dynamic probability value to account for the intrinsic properties of the immediately preceding pixel, and associating the updated probability value with the pixel.

Particular implementations can include one or more of the following features. The set of feature probability values can include a first feature probability value corresponding to a primary feature of the object and a second feature probability value corresponding to a secondary feature of the object, the primary feature being different from the secondary feature. The object can be an eye and the primary feature of the object is a redeye effect. The method can further comprise comparing the object probability value against a threshold value, and if the object probability value meets or exceeds the threshold value, then determining that the pixel corresponds to the object.

In general, in another aspect, the techniques include identifying a set of candidate pixels in the image, and reducing the number of pixels in the set of candidate pixels by performing a dynamic probability scan of the image. Performing the dynamic probability scan includes scanning a sequence of pixels in the image, each pixel having one or more intrinsic properties including one or more color values; and generating a dynamic probability value for each of one or more pixels in the sequence. The dynamic probability value for a given pixel represents a probability that the given pixel has neighboring pixels in the sequence that correspond to a feature of the object. The dynamic probability value is generated by identifying the dynamic probability value generated for a pixel that immediately precedes the given pixel in the sequence, updating the identified dynamic probability value to account for the intrinsic properties of the immediately preceding pixel; and associating the updated probability value with the given pixel.

In general, in another aspect, the techniques include scanning a sequence of pixels in the image; and calculating a dynamic probability value for a pixel in the sequence of pixels based on the following equation: $pD(x+1)=p(x)+w*pD(x)$, where x represents a position in the sequence; $p(x)$ is an intrinsic probability value representing the probability that a pixel located at position x corresponds to a feature of the object; $pD(x)$ is a dynamic probability value representing the probability that a pixel located at position x has neighboring pixels in the sequence that correspond to a feature of the object; and w is a weighting coefficient that determines how much influence $pD(x)$ has on $pD(x+1)$.

The invention can be implemented to realize one or more of the following advantages. The use of dynamic probabilities can reduce the time and processing power required to perform object detection. The dynamic probability scan reduces the number of computations that are required to compute an object probability for a given pixel. By enabling the use of one-dimensional templates instead of two-dimensional templates, the dynamic probability scans decrease the region of comparison by one dimension. Furthermore, by inherently accounting for object distortions, the dynamic probability scan reduces the need to use multiple templates. The use of dynamic probabilities can also increase the object detection accuracy by reducing the number of false detections and missed detections.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference symbols in the various drawings indicate like elements.

DETAILED DESCRIPTION

The present invention provides systems and methods, including computer program products, for detecting an object in an image. The invention can be used to detect any object in an image so long as the object can be defined by a set of parameterized features and a one-dimensional scan through a portion of the image corresponding to the object produces a recognizable pattern that distinguishes the object from other objects in the image.

Figure 1:
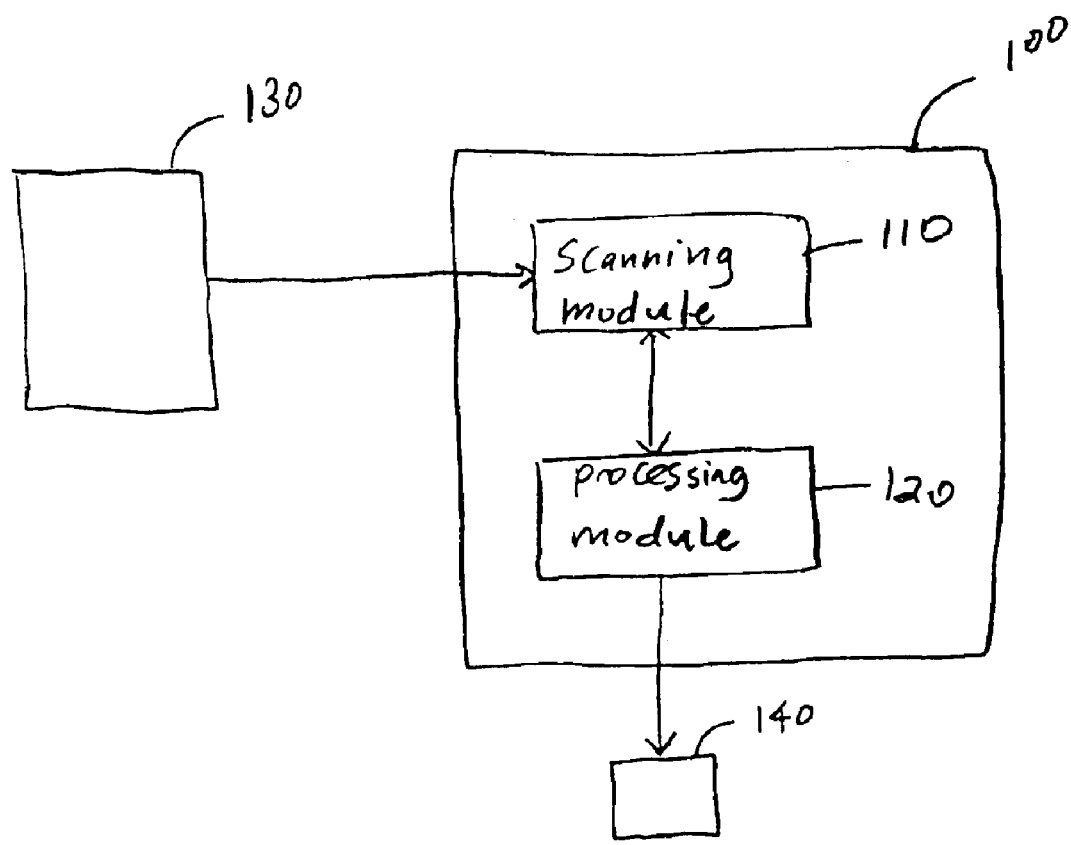
FIG. 1 is diagram of an object detection system in accordance with the invention.

As shown in FIG. 1, a system 100 in accordance with the invention includes a scanning module 110 and a processing module 120. The scanning module 110 and the processing module 120 can be implemented either as separate modules or as a single integrated module.

The scanning module 110 is operable to receive an image 130. The image 130 can be a raster of rows and columns of pixels. Each pixel has one or more intrinsic properties (e.g., color, opacity) and each intrinsic property can have one or more associated values. Thus, for example, color values can be represented as a set of values in any of a variety of color systems, such as the RGB (red-green-blue) color system, the CMYK (cyan-magenta-yellow-key) color system or the HSV (hue-saturation-value) color system.

The scanning module 110 is further operable to scan the image 130 in any orientation (e.g., horizontally or vertically) or direction (e.g., left or right, up or down). The scanning module 110 can scan the image pixel-by-pixel, or according to some other pattern (e.g., every other pixel, every other row).

The processing module 120 is operable to detect an object in the scanned image 130. The output 140 of the processing module can include data that identifies one or more pixels in the image as corresponding to an object of interest. The output 140 can be used in color adjustments such as those described in co-pending U.S. application Ser. No. 10/639,612, filed on Aug. 11, 2003, entitled "Feature-Based Color Adjustment", the contents of which are incorporated by this reference.

As used in this specification, the object of interest is an object that can be described by a set of parameterized features. The set of features can include primary features that are more indicative of the object and secondary features that are less indicative of the object. The object can also be described in terms of relationships between the features. The relationships can include spatial relationships, for example, proximity between two or more of the features.

The processing module 120 detects the location of an object in the image 130 by identifying pixels in the image that correspond to one or more of the features of the object. A pixel that corresponds to a feature has certain characteristic property values (or ranges of values). For example, in the case where the object is an eye that exhibits the redeye effect, the characteristic red pupil region is a primary feature of the eye and a pixel that corresponds to redeye has the characteristic color value of red.

Feature Probabilities

To determine whether a given pixel corresponds to a given feature of the object, the processing module 120 examines the property values associated with the given pixel and computes a probability value that represents the likelihood that the given pixel corresponds to the given feature. This probability value will be referred to as a feature probability value.

More than one feature probability value can be calculated for a given pixel. Each feature probability value refers to a different feature of the object. The set of feature probability values for a given pixel can be expressed as a vector, $p(x)$, that includes each of the feature probability values (e.g., pFeature1(x), pFeature2(x), and so on).

A given feature probability value can be expressed in two forms, an intrinsic form (referred to as an intrinsic probability value) and a dynamic form (referred to as a dynamic probability value). The intrinsic probability value for a given pixel indicates the likelihood that the feature is present at a given pixel. The dynamic probability value for a given pixel indicates the likelihood that the feature is present at pixels nearby to the given pixel.

The intrinsic probability value for a given pixel can be calculated based on a probability equation. The equation takes as input one or more of the property values associated with the pixel and outputs the intrinsic probability value. The probability equation can be derived based on manual experimentation.

Alternatively, the intrinsic probability value can be calculated based on a feed forward neural network. The inputs to the network can be, for example, pixel color values as well as minimum, maximum and average color values for a window surrounding the pixel of width and height equal to the maximum expected object size. The outputs are the intrinsic probability values. During training, the output values are trained to be either 0 or 1 by masking the appropriate regions in alpha channels associated with the image. After training, the output values take on a continuous range from 0 to 1. In one implementation, the neural network has 25 hidden nodes with sigmoid nonlinearities at all the nodes including the output nodes. Other statistical training methods may also be used in place of the neural network, such as a sum-of-Gaussian statistical model.

For a given sequence of pixels, the dynamic probabilities are calculated by iterating through each pixel in the sequence in the order that the pixels are scanned. For example, if a sequence is scanned from left to right, then the first iteration operates on the left-most pixel in the sequence and each subsequent iteration advances one pixel to the right. This is further illustrated in FIG. 3.

Figure 3:
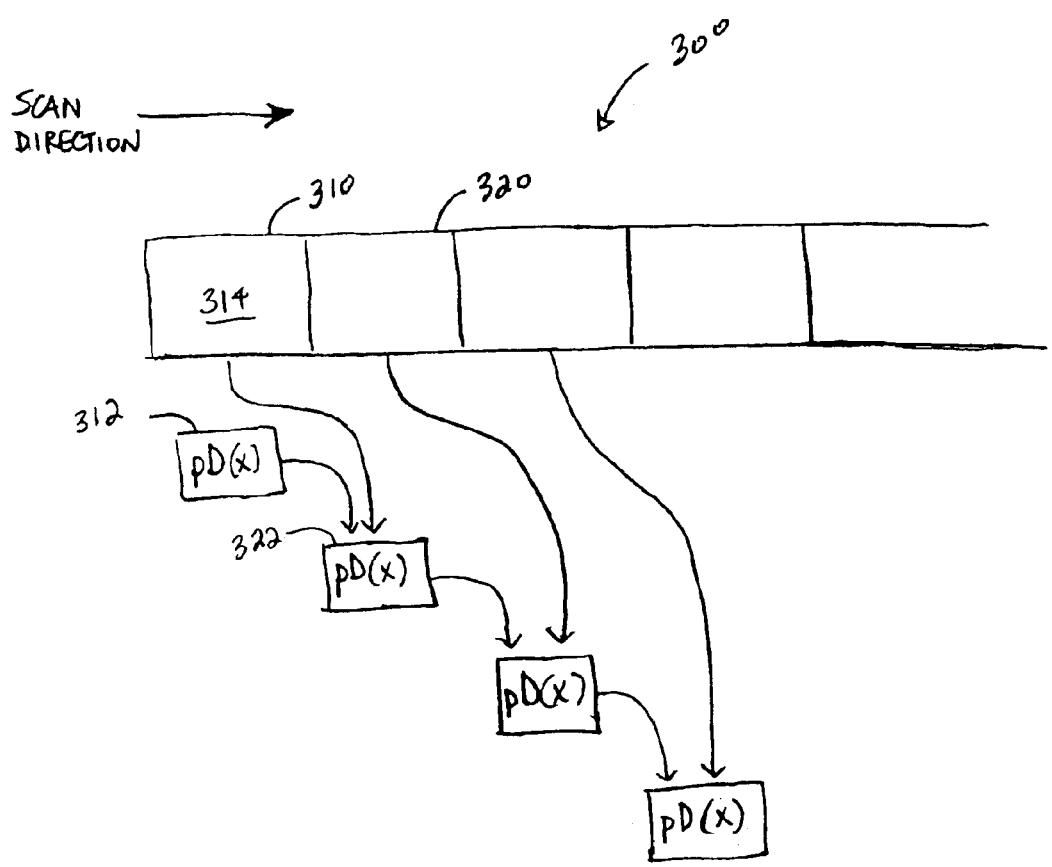
FIG. 3 is a diagram of how dynamic probabilities are calculated.

As shown in FIG. 3, during the first iteration, the dynamic probability value 312 of the first pixel 310 in the sequence 300 can be set to an initial value.

For each subsequent iteration, the dynamic probability value is calculated by taking the dynamic probability value calculated for the previous pixel in the sequence and updating it to incorporate the intrinsic probability value for the previous pixel. For example, during the second iteration, the dynamic feature probability 322 of the second pixel 320 in the sequence is calculated by identifying the dynamic probability value 312 of the first pixel, updating the dynamic probability value 312 of the first pixel to incorporate the intrinsic probability value 314 of the first pixel, and associating the updated dynamic probability value 322 with the second pixel.

Figure 4:
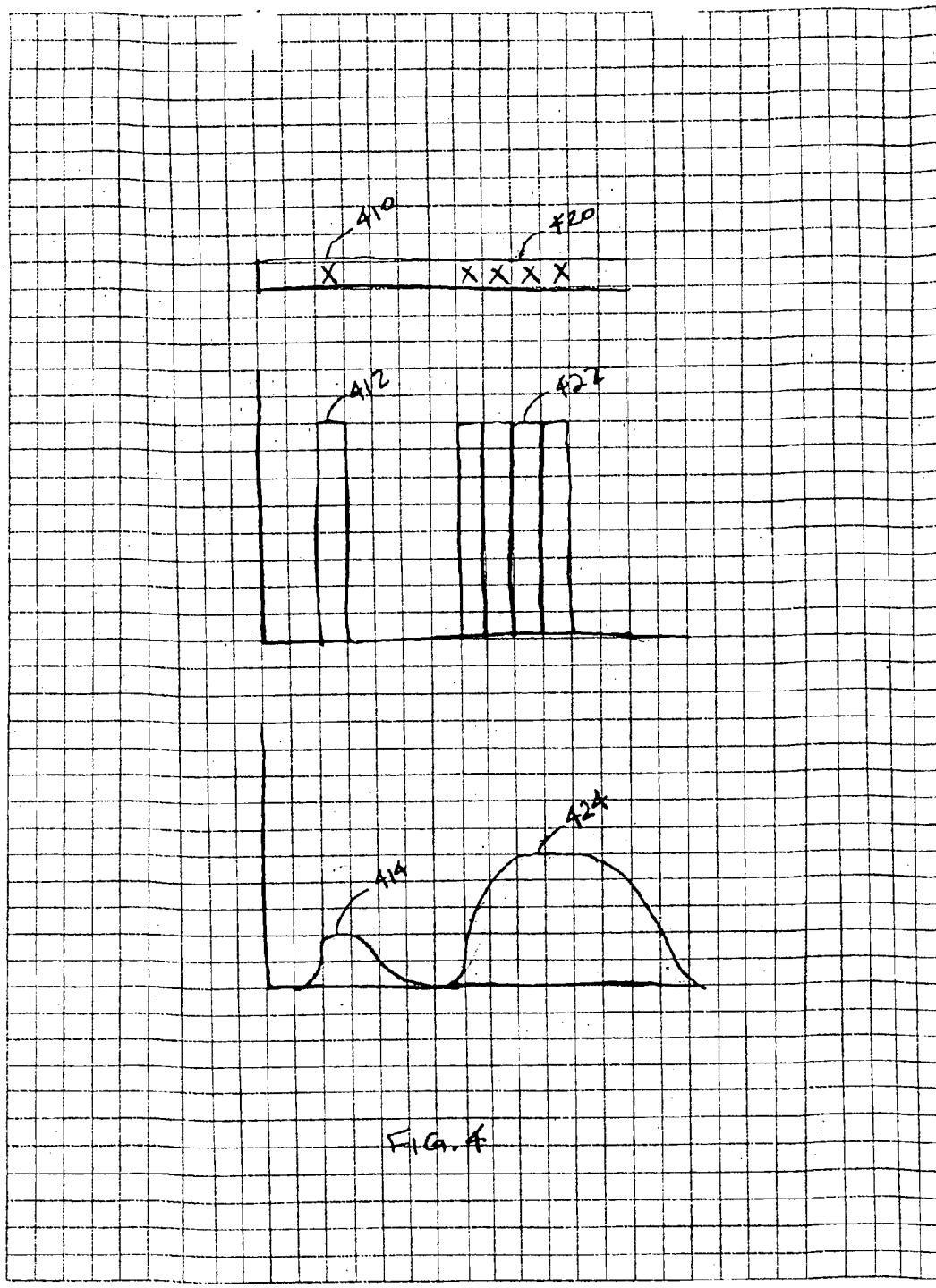
FIG. 4 is a diagram illustrating intrinsic and dynamic probabilities.

The method for calculating dynamic probability values is dynamic in the sense that the calculation performed in a given iteration for a given pixel in the sequence is incorporated into the calculation performed in a subsequent iteration for a subsequent pixel in the sequence. The dynamic aspect of the calculation enables the dynamic probability value for a given pixel to account for the presence of the feature in nearby preceding pixels. By contrast, the intrinsic feature probability for the given pixel only accounts for the presence of the feature in the given pixel, but not in nearby pixels. This difference is illustrated in FIG. 4, which shows a sequence of pixels that includes a first pixel 410 and a second pixel 420.

The first pixel 410 corresponds to a feature (shown as X), but its neighboring pixels do not. The second pixel 420 corresponds to the same feature and so do its neighboring pixels. As shown, the intrinsic probability values 412, 422 would be the same for the first pixel 410 and the second pixel 420 but their dynamic probability values 414, 424 would differ due to the absence or presence of the feature in nearby pixels.

The amount of influence that the nearby pixels have on the dynamic feature probability of a given pixel (or in other words, the rate at which the dynamic probability value grows and decays) can be controlled by introducing a weighting coefficient into the dynamic feature probability calculation, as illustrated by the following equation:

$$pD(x+1)=p(x)+gain*pD(x),$$

where:

pD(x+1) represents the dynamic probability value of the pixel p(x) represents the intrinsic probability value of the immediately preceding pixel pD(x) represents the dynamic probability value of the immediately preceding pixel and gain represents the weighting coefficient.

The value of gain can be determined based on manual experimentation and can be defined separately for each feature. The higher the gain value, the more weight that is given to the dynamic probability of the preceding pixel and the faster the dynamic probabilities build up across the sequence. The value of gain can be defined to range between 0 and 1.

Object Probabilities

The feature probabilities can be used to determine an object probability for a given pixel. The object probability represents the likelihood that the given pixel corresponds to the object of interest. The object probability can, for example, represent the probability that the given pixel corresponds to the center of the object of interest. The size of the object can be determined by calculating object probabilities corresponding to a range of sizes. The size that produces the largest object probability value is the size of the object.

In one implementation, the object probability for a given pixel can be computed by identifying a window of pixels centered on the given pixel and identifying the set of dynamic probability values, pD(x'), computed for the pixel at each coordinate position, x', in the window, where x is the center window coordinate, and L is the window length.

The set, PD(x), of dynamic probability values for the window can be expressed as:

$$PD(x)=\{pD(x-L/2), pD(x-L/2+1), \ldots pD(x), pD(x+1), \ldots pD(x+L/2-1), pD(x+L/2)\}$$

The set of dynamic probabilities, PD(x), can be compared to a template that specifies a set of expected probabilities for the object of interest.

The similarity of the template to the dynamic probabilities can be measured. As illustrated in the following equations, the similarity can be calculated as a product of similarities for each spatial location x' in the window:

$$s(Pt, PD(x))=\text{Product}[x'] [s(pt(x-x'), pD(x'))],$$

where:

s(p1, p2)=$\text{Sum}_a$ {minimum[$p1_a$, $p2_a$]}/norm, and norm=minimum [$\text{Sum}_b$ $p1_b$, $\text{Sum}_c$ $p2_c$].

The indices a, b, c range over the various feature-specific probability components that make up the probability values p(x) and pD(x). Any similarity above a threshold value can be considered a detected object.

The expected probabilities provided in the template are based on a typical version of the object. However, an object may typically have more than one version. For example, for a human eye, there is a large variability in the shape and feature makeup of the eye. The conventional approach is to create multiple templates with various sizes and a range of other distortions and to compare the feature probabilities for the scanned window against each of the multiple templates.

However, by expressing the feature probabilities in the dynamic form described above, it is not necessary to use multiple templates. Because the dynamic probabilities account for the presence of the feature in nearby pixels, this provides enough leeway when matching to a given template to accommodate matches to slightly distorted versions of the object.

Red Eye Detection

The following paragraphs describe the application of the above-described techniques to detect an eye where portions of the eye exhibit the redeye effect. Such an eye will be referred to as a Red Eye.

Figure 2:
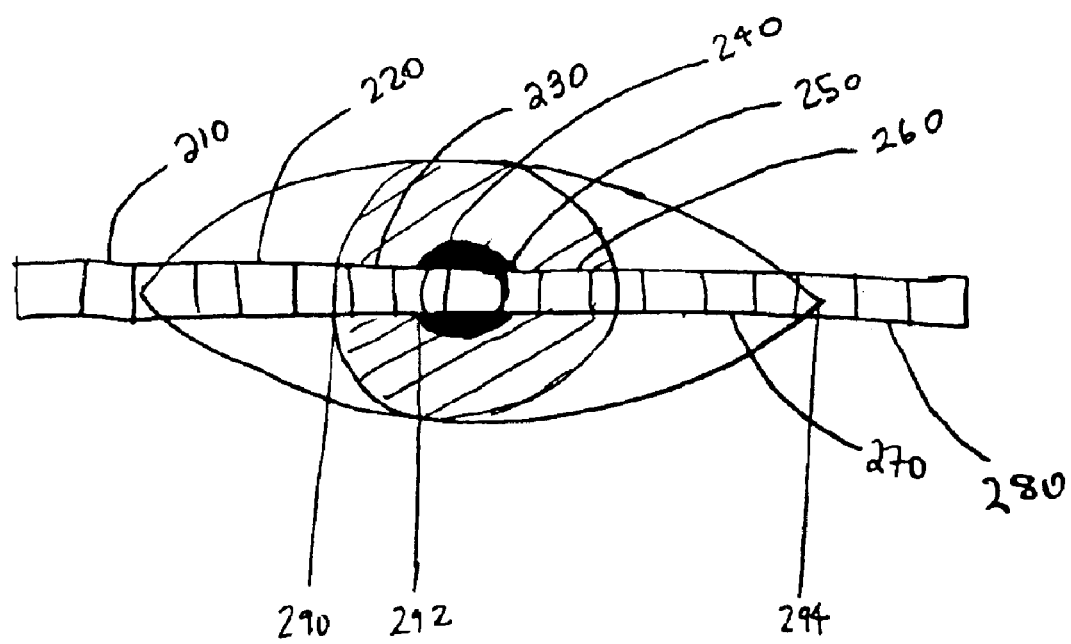
FIG. 2 is a diagram of a one-dimensional scan across a human eye.

As shown in FIG. 2, a one-dimensional (linear) scan through the neighborhood of a Red Eye encounters pixels corresponding to skin tones 210, sclera white tones 220, iris colors 230 (e.g., blue, brown, etc.), bright red tones 240 from the redeye effect, perhaps some highlight (not shown) and more bright red 250, then back to iris 260, sclera 270 and skin tones 280. In addition to these color features, an edge detection feature would be high for vertical edges near the sclera-iris junction 290 and the redeye-iris junction 292 and perhaps at the skin-eye junction 294.

For Red Eye detection, the set of feature probabilities can include one or more of the following feature probabilities:

pSkin(x)—The probability that the pixel corresponds to skin;

pSclera(x)—The probability that the pixel corresponds to sclera;

pIris(x)—The probability that the pixel corresponds to iris;

pRedeye(x)—The probability that the pixel corresponds to redeye;

pHighlight(x)—The probability that the pixel corresponds to highlight;

pEdge(x)—The probability that the pixel corresponds to an edge.

The feature probabilities can be calculated using one or more feature probability equations. The feature probability equations can be derived based on analyzing images containing Red Eyes and images that do not contain Red Eyes.

For redeye:

pRedeye(x)0 if (red<=green or red<=blue)

else 0.5[red−green+red−blue]/[red+green+blue]

Additionally, pRedeye(x) can also be set to zero if the luminance is less than a threshold value:

pRedeye(x)=0 if (luminance<luminanceThreshold) where:

luminance=0.3 red+0.59 green+0.11 blue,
luminanceThreshold=0.25*meanLuminance, and
meanLuminance is the mean value of the luminance averaged over all pixels in the image.

Alternatively, pRedeye(x) can be calculated as follows:

| | |
|---|---|
| pRedeye(x) = exp[−k1 (u1 − u10)$^2$ −k2 (u2 − u20)$^2$], where: | |
| u1 = r − 0.5216 g | u2 = 0.5216 r + g |
| u10 = 0.45, | u20 = 0.505, |
| k1 = 0.5/(sigma1$^2$), | k2 = 0.5/(sigma2$^2$), |
| r = red/[red + green + blue], | g = green/[red + green + blue], |
| sigma1 = 0.12, | sigma2 = 0.08. |

For highlight:

$p$Highlight$(x)$=exp(−(maximumluminance−luminance$(x)$)/spreadInLuminance), where:

maximumLuminance=the maximum luminance value for all pixels in the image, spreadInLuminance=40 (for RGB color values which range from 0 to 255).

For skin, sclera, iris:

The feature probability can be computed using the alternate pRedeye(x) function above, but substituting the following values:

| | |
|---|---|
| For skin: | |
| u10 = 0.27, | u20 = 0.52, |
| sigma1 = 0.05, | sigma 2 = 0.05. |
| For sclera: | |
| u10 = 0.16, | u20 = 0.49, |
| sigma1 = 0.05, | sigma2 = 0.05, |
| For blue iris: | |
| u10 = 0.16, | u20 = 0.51, |
| sigma1 = 0.03, | sigma2 = 0.02, |
| For brown iris: | |
| u10 = 0.35, | u20 = 0.54, |
| sigma1 = 0.06, | sigma2 = 0.02. |

For edge:

$p$Edge$(x)$=1−exp(−$k$Edge|<c1>−<c2>|), where:

<c1>=the average color taken over a strip of pixels located at x coordinates (x−dx) to x and height dy, <c2>=the average color taken over a strip of pixels located at x coordinates x to (x+dx) and height dy, where the strip of pixels used to calculate c1 and c2 is perpendicular to the orientation of the scan, so for a horizontal scan, the strip of pixels is a vertical strip, and for a vertical scan, the strip is horizontal.

dx=3, dy=3, and kEdge=0.1

For the calculation of dynamic probabilities, the gain value can be expressed as 1-gamma, using the following gamma values:

| | |
|---|---|
| gammaSkin = 0.01, | gammaSclera = 0.02, |
| gammaRedeye = 0.1, | gammaHighlight = 0.02, |
| gammaEdge = 0.1, | |

Gamma represents the rate at which the dynamic probabilities decay when the intrinsic probabilities have a value of zero. Low values for skin, sclera, and highlight give these probabilities influence over a larger spatial extent. The spatial extent over which the dynamic probabilities decay is of the order of the inverse of gamma. Thus, gamma can be set to be the inverse of the number of pixels over which the decay will occur. For example, a gamma value of 0.02 produces decay over roughly 1/0.02=50 pixels. Similarly a value of 0.1 produces decay over 10 pixels.

The object probability for a red eye can be computed using one or more of the following equations:

$p$Eye$(x)$=fuzzyOr$(p$Redeye$(x)*p$Highlight$D(x),$
  $p$Redeye$(x)*p$Sclera$D(x))$, where:

fuzyOr$(p1, p2)$=$p1$+$p2$−$p1*p2$.

This identifies redeye-colored pixels that have regions of sclera or highlight colors nearby.

Alternatively, the following equation can be used:

$p$Eye$(x)$=(⅓)*$pa(x)$+(⅓)*$pb(x)$+(⅓)*$pc(x)$, where:

pa(x)=pRedeye(x)*pScleraD(x)*pNotScleraD(x), pb(x)=pRedeyeD(x)*pHighlightD(x), and pc(x)=pRedeye(x)*pScleraD(x)*pNotScleraD(x)*pHighlightD(x).

In this equation, pa represents the probability of finding a redeye feature with a nearby sclera region and a nearby non-sclera region; pb represents the probability of finding a redeye feature with a nearby highlight region; and pc represents the probability of finding a redeye feature with a nearby highlight region, a nearby sclera region, and a nearby non-sclera region. The dynamic probabilities used in this equation can be calculated as follows:

$p$NotSclera$D(x+1)$=$p$NotSclera$(x)$+gain$NS*p$NotSclera$D(x)$ $p$Sclera$D(x+1)$=$p$Sclera$(x)$+gain$s*p$Sclera$D(x)$, $p$Redeye$D(x+1)$=$p$Redeye$(x)$+gain$R*p$Redeye$D(x)$, $p$Highlight$D(x+1)$=$p$Highlight$(x)$+gain$H*p$Highlight$D$, where:

gainNS=0.985, gainS=0.98, gainR=0.96, gainh=0.8.

The dynamic probability values can be normalized after each step so that the value lies between 0 and 1. The intrinsic probabilities can be calculated as:

$p\text{NotSclera}(x)=1-p\text{Sclera}(x)$ $p\text{Sclera}(x)=1.0-\text{absoluteRedness}(x)$; and if $(p\text{Sclera}(x)<0.5)$ then $p\text{Sclera}(x)=0$, where:

if $(\text{red}(x)<=\text{green}(x)||\text{red}(x)<=\text{blue}(x))$ then $\text{absoluteRedness}(x)=0$ else $\text{absoluteRedness}(x)=\text{minimum}(1.0, \text{maximum}(\text{red}(x)-\text{green}(x), \text{red}(x)-\text{blue}(x))/30.0)$ $p\text{Redeye}(x)=\exp(-k1*(r(x)-r0)^2-k2*(g(x)-g0)^2)$; if $(p\text{Redeye}(x)<0.5)$ $p\text{Redeye}(x)=0$, where:
L(x)=red(x)+green(x)+blue(x)
r(x)=if (L(x)>0) then red(x)/L(x) else 0
g(x)=if (L(x)>0) then green(x)/L(x) else 0 and
k1=0.5/(0.119*0.119)
k2=0.5/(0.071*0.071)
r0=0.576
g0=0.207.

$p\text{Highlight}(x)=\exp(-(\text{luminanceMax}-\text{luminance}(x))/\text{luminanceSpread})$, if $(p\text{Highlight}(x)<0.5)p\text{Highlight}(x)=0$.

where:
luminance(x)=0.3*red(x)+0.59*green(x)+0.11 blue(x),
luminanceMax=maximum value of luminance in whole image,
luminanceSpread=40.

Multiple Scans

In one implementation, the system can perform multiple scans across the same pixels. Each subsequent scan can be configured identically to the prior scans or, alternatively, can be configured to proceed in a different direction or orientation. For example, if the first scan proceeds in a first direction (e.g., left to right) across a row of pixels then the second scan can proceed in the opposite direction (e.g., from right to left) across the same row. Subsequent scans can be performed up or down a column of pixels instead of across a row.

The object probability computed for a given pixel can differ from scan to scan because the features can differ from scan to scan depending on the direction or orientation of the scan. For example, if a left-to-right scan of a given row encounters the following sequence of features: skin, sclera, redeye, skin, then a right-to-left scan of the same row would encounter the opposite sequence: skin, redeye, sclera, skin. In one implementation, the system computes a first object probability value for a given pixel based on a first scan of the given pixel. The system then computes a second object probability value for the given pixel based on a second scan of the given pixel. If the second object probability value for the given pixel is higher than the first object probability value, then the system updates the object probability value for the given pixel to correspond to the second value instead of the first value. This update process can be repeated for each subsequent scan. In this way, the value of the object probability for the given pixel can correspond to the maximum value among all scans.

Integrated Approach

The above-described techniques can be used independently or alternatively, can be integrated into a larger multi-step process.

One such process uses a fast, but less accurate, initial filter to identify a set of candidate pixels in the image. For example, for red eye detection, the filtering process can involve scanning the image pixel by pixel to identify pixels having a degree of redness that exceeds a threshold value. The degree of redness can be measured using the pRedeye (x) functions described above. The threshold value can be, for example, one quarter of the maximum of pRedeye(x) throughout the image.

The process then uses the above-described dynamic probability techniques as an intermediate filter that reduces the number of candidate pixels in the set. In one implementation, an object probability is calculated for each candidate pixel identified by the initial filter. This can involve computing dynamic probabilities for each row that contains one or more candidate pixels and skipping rows that do not contain any candidate pixels.

Optionally, the process then uses a slower, but more accurate filter to analyze each candidate pixel in the reduced set. In one implementation, this can involve identifying a two-dimensional window of pixels centered on a candidate pixel and comparing the window of pixels against one or more two-dimensional templates of the expected object. One such two-dimensional technique is described in U.S. Pat. No. 6,204,858, entitled System and Method for Adjusting Color Data of Pixels in a Digital Image, the contents of which are incorporated by this reference.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. The invention can be generally applied to the detection of any object that can be defined according to a set of one-dimensional features. For example, a red apple may be detected using a combination of red edge features and red color features. A red positive edge followed by red color followed by a red negative edge indicates the presence of the apple. The probability values described in this application can be used in color adjustments such as those described in the above-referenced patent application filed on Aug. 11, 2003, entitled "Feature-Based Color Adjustment".

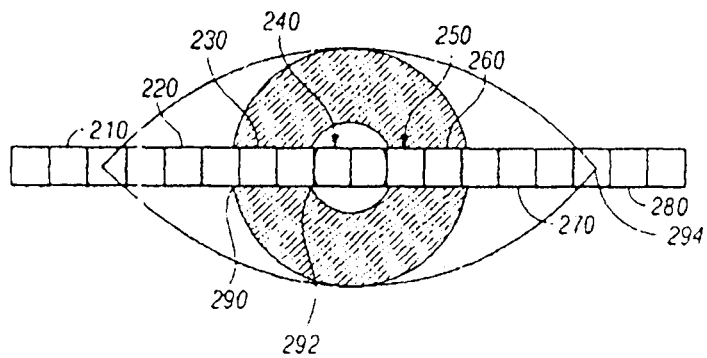

What is claimed is:

1. A computer-implemented method for detecting an object in an image, the method comprising:
   scanning a sequence of pixels in the image, each pixel having one or more property values associated with properties of the pixel; and
   generating a dynamic probability value for each of one or more pixels in the sequence, wherein the dynamic probability value for a given pixel represents a probability that the given pixel has neighboring pixels in the sequence that correspond to one or more features of the object and the dynamic probability value is generated by:
      identifying a dynamic probability value associated with a pixel that immediately precedes the given pixel in the sequence;
      updating, the identified dynamic probability value based on the property values of the immediately preceding pixel; and
      associating the updated probability value with the given pixel.

2. The method of claim 1, wherein updating the identified dynamic probability value includes:
   calculating an intrinsic probability value for the immediately preceding pixel based on one or more property values for the immediately preceding pixel, wherein the intrinsic probability value for the immediately preceding pixel represents a probability that the immediately preceding pixel corresponds to one or more features of the object; and
   updating the identified dynamic probability value based on the intrinsic probability value calculated for the immediately preceding pixel.

3. The method of claim 2, wherein one or more of the property values for the immediately preceding pixel are derived from property values of other nearby pixels.

4. The method of claim 1, wherein updating the identified dynamic probability value includes:
   multiplying the identified dynamic probability value by a weighting coefficient.

5. The method of claim 1, wherein:
   the dynamic probability value is a vector that includes one or more components, each component corresponding to a different feature of the object.

6. The method of claim 1, further comprising:
   using the dynamic probability value of a pixel to calculate an object probability value for the pixel, the object probability value representing the probability that the pixel corresponds to the object.

7. The method of claim 1, wherein:
   the object is an eye; and
   a feature of the object includes a redeye effect.

8. A computer-implemented method for detecting an object in an image, the method comprising:
   scanning a sequence of pixels in the image, each pixel having one or more property values for one or more properties of the pixel;
   calculating a set of feature probability values for each of one or more pixels in the sequence, each feature probability value representing a probability that the pixel corresponds to a feature of the object, each feature probability in the set corresponding to a different feature of the object; and
   using the feature probability values to calculate an object probability value for the pixel, the object probability value representing the probability that the pixel corresponds to the object,
   wherein each feature probability includes a dynamic probability value that is generated by:
      identifying the dynamic probability value of an immediately preceding pixel in the sequence;
      updating the identified dynamic probability value to account for the intrinsic properties of the immediately preceding pixel; and
      associating the updated probability value with the pixel.

9. The method of claim 8, wherein the set of feature probability values includes: a first feature probability value corresponding to a primary feature of the object; and a second feature probability value corresponding to a secondary feature of the object, the primary feature being different from the secondary feature.

10. The method of claim 9, wherein:
    the object is an eye; and
    the primary feature of the object is a redeye effect.

11. The method of claim 9, further comprising:
    comparing the object probability value against a threshold value; and
    if the object probability value meets or exceeds the threshold value, then determining that the pixel corresponds to the object.

12. A computer-implemented method for detecting an object in an image, the method comprising:
    identifying a set of candidate pixels in the image; and
    reducing the number of pixels in the set of candidate pixels by performing a dynamic probability scan of the image, wherein performing the dynamic probability scan includes:
       scanning a sequence of pixels in the image, each pixel having one or more intrinsic properties including one or more color values; and
       generating a dynamic probability value for each of one or more pixels in the sequence, wherein the dynamic probability value for a given pixel represents a probability that the given pixel has neighboring pixels in the sequence that correspond to a feature of the object and the dynamic probability value is generated by:
          identifying the dynamic probability value generated for a pixel that immediately precedes the given pixel in the sequence;
          updating the identified dynamic probability value to account for the intrinsic properties of the immediately preceding pixel; and
          associating the updated probability value with the given pixel.

13. The method of claim 12, further comprising: identifying one or more pixels in the reduced set of candidate pixels as corresponding to the object.

14. A computer-implemented method for detecting an object in an image, the method comprising:

scanning a sequence of pixels in the image; and calculating a dynamic probability value for a pixel in the sequence of pixels based on the following equation:

$$pD(x+1)=p(x)+w*pD(x),$$

wherein:

x represents a position in the sequence;

p(x) is an intrinsic probability value representing the probability that a pixel located at position x corresponds to a feature of the object;

pD(x) is a dynamic probability value representing the probability that a pixel located at position x has neighboring pixels in the sequence that correspond to a feature of the object; and w is a weighting coefficient that determines how influence pD(x) has on pD(x+1).

15. A computer-program product, tangibly embodied in a computer readable medium, for detecting an object in an image, the computer program product being operable to cause data processing equipment to perform operations comprising:

scanning a sequence of pixels in the image, each pixel having one or more property values associated with properties of the pixel; and generating a dynamic probability value for each of one or more pixels in the sequence, wherein the dynamic probability value for a given pixel represents a probability that the given pixel has neighboring pixels in the sequence that correspond to one or more features, of the object and the dynamic probability value is generated by:

identifying a dynamic probability value associated with a pixel that immediately precedes the given pixel in the sequence;

updating the identified dynamic probability value based on the property values of the immediately preceding pixel; and associating the updated probability value with the given pixel.

16. The product of claim 15, wherein updating the identified dynamic probability value includes:

calculating an intrinsic probability value for the immediately preceding pixel based on one or more property values for the immediately preceding pixel, wherein the intrinsic probability value for the immediately preceding pixel represents a probability that the immediately preceding pixel corresponds to one or more features of the object; and updating the identified dynamic probability value based on the intrinsic probability value calculated for the immediately preceding pixel.

17. The product of claim 16, wherein one or more of the property values for the immediately preceding pixel are derived from property values of other nearby pixels.

18. The product of claim 15, wherein updating the identified dynamic probability value includes:

multiplying the identified dynamic probability value by a weighting coefficient.

19. The product of claim 15, wherein:

the dynamic probability value is a vector that includes one or more components, each component corresponding to a different feature of the object.

20. The product of claim 15, wherein the operations further comprise:

using the dynamic probability value of a pixel to calculate an object probability value for the pixel, the object probability value representing the probability that the pixel corresponds to the object.

21. The product of claim 15, wherein:

the object is an eye; and a feature of the object includes a redeye effect.

22. A computer-program product, tangibly embodied in a computer readable medium, for detecting an object in an image, the computer program product being operable to cause data processing equipment to perform operations comprising:

scanning a sequence of pixels in the image, each pixel having one or more property values for one or more properties of the pixel;

calculating a set of feature probability values for each of one or more pixels in the sequence, each feature probability value representing a probability that the pixel corresponds to a feature of the object, each feature probability in the set corresponding to a different feature of the object; and using the feature probability values to calculate an object probability value for the pixel, the object probability value representing the probability that the pixel corresponds to the object, wherein each feature probability includes a dynamic probability value that is generated by:

identifying the dynamic probability value of an immediately preceding pixel in the sequence;

updating the identified dynamic probability value to account for the intrinsic properties of the immediately preceding pixel; and associating the updated probability value with the pixel.

23. The product of claim 22, wherein the set of feature probability values includes: a first feature probability value corresponding to a primary feature of the object; and a second feature probability value corresponding to a secondary feature of the object, the primary feature being different from the secondary feature.

24. The product of claim 23, wherein:

the object is an eye; and the primary feature of the object is a redeye effect.

25. The product of claim 23, further comprising:

comparing the object probability value against a threshold value; and if the object probability value meets or exceeds the threshold value, then determining that the pixel corresponds to the object.

26. A computer-program product, tangibly embodied in a computer readable medium, for detecting an object in an image, the computer program product being operable to cause data processing equipment to perform operations comprising:

identifying a set of candidate pixels in the image; and reducing the number of pixels in the set of candidate pixels by performing a dynamic probability scan of the image, wherein performing the dynamic probability scan includes:

scanning a sequence of pixels in the image, each pixel having one or more intrinsic properties including one or more color values; and generating a dynamic probability value for each of one or more pixels in the sequence, wherein the dynamic probability value for a given pixel represents a probability that the given pixel has neighboring pixels in the sequence that correspond to a feature of the object and the dynamic probability value is generated by:

identifying the dynamic probability value generated for a pixel that immediately precedes the given pixel in the sequence;

updating the identified dynamic probability value to account for the intrinsic properties of the immediately preceding pixel; and associating the updated probability value with the given pixel.

27. The product of claim 26, further comprising:

identifying one or more pixels in the reduced set of candidate pixels as corresponding to the object.

28. A computer-program product, tangibly embodied in a computer readable medium, for detecting an object in an image, the computer program product being operable to cause data processing equipment to perform operations comprising:

scanning a sequence of pixels in the image; and calculating a dynamic probability value for a pixel in the sequence of pixels based on the following equation:

$$pD(x+1)=p(x)+w*pD(x),$$

wherein:

x represents a position in the sequence;

p(x) is an intrinsic probability value representing the probability that a pixel located at position x corresponds to a feature of the object;

pD(x) is a dynamic probability value representing the probability that a pixel located at position x has neighboring pixels in the sequence that correspond to a feature of the object; and w is a weighting coefficient that determines how influence pD(x) has on pD(x+1).

* * * * *

UNITED STATES PATENT AND TRADEMARK OFFICE
CERTIFICATE OF CORRECTION

Page 1 of 3

PATENT NO. : 6,912,298 B1
APPLICATION NO. : 10/639238
DATED : June 28, 2005
INVENTOR(S) : Gregg D. Wilensky It is certified that error appears in the above-identified patent and that said Letters Patent is hereby corrected as shown below:

The title page showing the illustrative figure should be deleted to be replaced with the attached title page.

In the drawings, Sheet 1, Figure 1 and 2, replace the entire figure with:

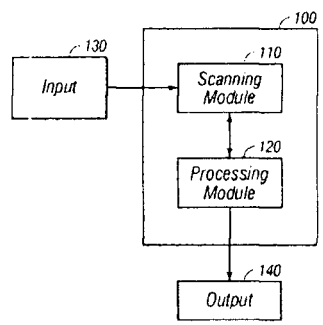

FIG. 1

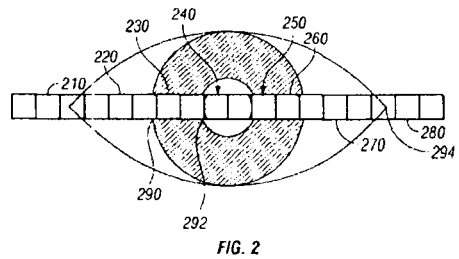

FIG. 2

Signed and Sealed this
Sixteenth Day of October, 2012

David J. Kappos
*Director of the United States Patent and Trademark Office*

CERTIFICATE OF CORRECTION (continued)
U.S. Pat. No. 6,912,298 B1

In the drawings, Sheet 2, Figure 3, replace the entire figure with this figure:

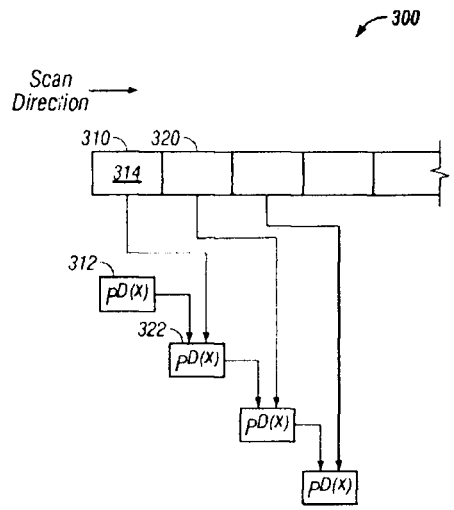

FIG. 3

In the drawings, Sheet 3, Figure 4, replace the entire figure with this figure:

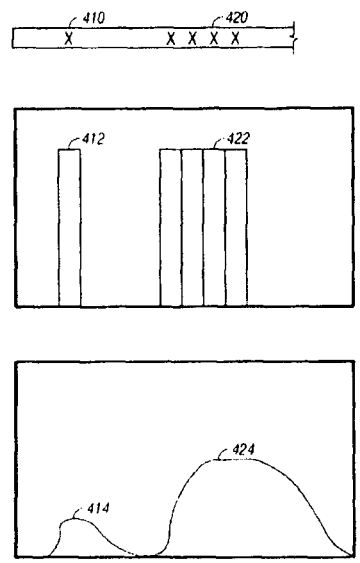

FIG. 4

Column 11, line 35, delete the "," after "updating".

(12) United States Patent
Wilensky

(10) Patent No.: US 6,912,298 B1
(45) Date of Patent: Jun. 28, 2005

(54) OBJECT DETECTION USING DYNAMIC PROBABILITY SCANS

(75) Inventor: Gregg D. Wilensky, Pacific Palisades, CA (US)

(73) Assignee: Adobe Systems Incorporated, San Jose, CA (US)

(\*) Notice: Subject to any disclaimer, the term of this patent is extended or adjusted under 35 U.S.C. 154(b) by 95 days.

(21) Appl. No.: 10/639,238

(22) Filed: Aug. 11, 2003

(51) Int. Cl.[7] .............................................. A61B 5/117
(52) U.S. Cl. ........................ 382/117; 382/115; 382/190; 382/199; 345/581
(58) Field of Search ................................. 382/194, 190, 382/195, 199, 117, 115; 345/581, 619

(56) References Cited

U.S. PATENT DOCUMENTS

| 6,204,858 B1 | 3/2001 | Gupta |
| 2002/0106112 A1 \* | 8/2002 | Chen et al. ............... 382/117 |
| 2003/0190080 A1 \* | 10/2003 | Simard et al. ............ 382/238 |

OTHER PUBLICATIONS

Jia Li and James Z. Wang, "Automatic Linguistic Indexing of Pictures By a Statistical Modeling Approach," Abstract, pp. 1–24 (2003).

Jiuliu Lu and Lawrence Carin, Dept. of Electrical and Computer Engineering, Duke University, Durham, NC 27708–0291, "Hidden Markov Multiresolution Textures Segmentation," Abstract, pp. 1–28.

\* cited by examiner

*Primary Examiner*—Richard Hjerpe
*Assistant Examiner*—Michelle K. Lay
(74) *Attorney, Agent, or Firm*—Fish & Richardson P.C.

(57) ABSTRACT

Methods and apparatus, including computer program products, for detecting an object in an image. The techniques include scanning a sequence of pixels in the image, each pixel having one or more property values associated with properties of the pixel, and generating a dynamic probability value for each of one or more pixels in the sequence. The dynamic probability value for a given pixel represents a probability that the given pixel has neighboring pixels in the sequence that correspond to one or more features of the object. The dynamic probability value is generated by identifying a dynamic probability value associated with a pixel that immediately precedes the given pixel in the sequence; updating the identified dynamic probability value based on the property values of the immediately preceding pixel; and associating the updated probability value with the given pixel.

28 Claims, 4 Drawing Sheets